May 16, 1933.   A. N. CALKINS   1,909,752
TREE AND PLANT DIGGING IMPLEMENT
Filed Jan. 23, 1932   4 Sheets-Sheet 1

Inventor
Addison N. Calkins

May 16, 1933.  A. N. CALKINS  1,909,752
TREE AND PLANT DIGGING IMPLEMENT
Filed Jan. 23, 1932  4 Sheets-Sheet 2

Inventor
Addison N. Calkins

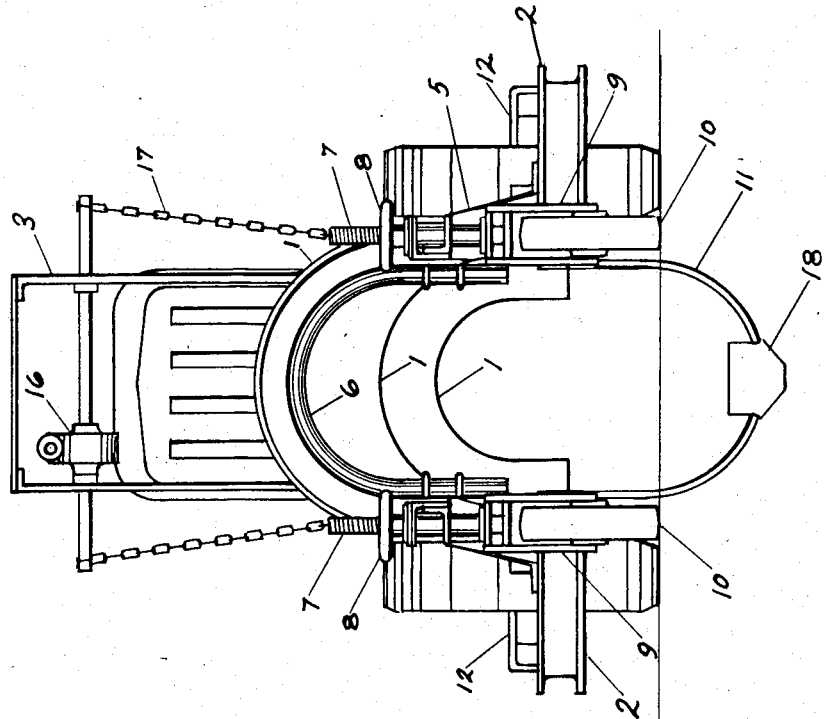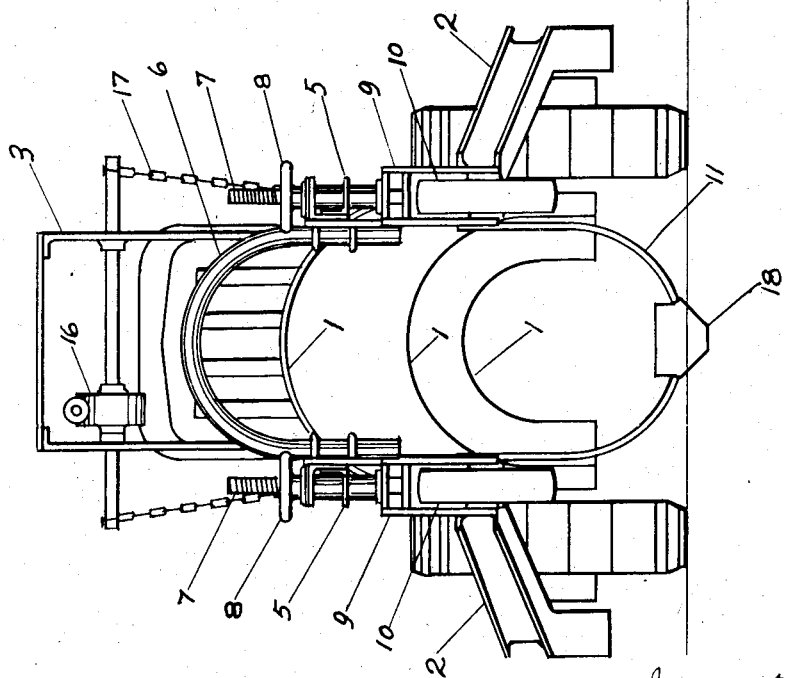

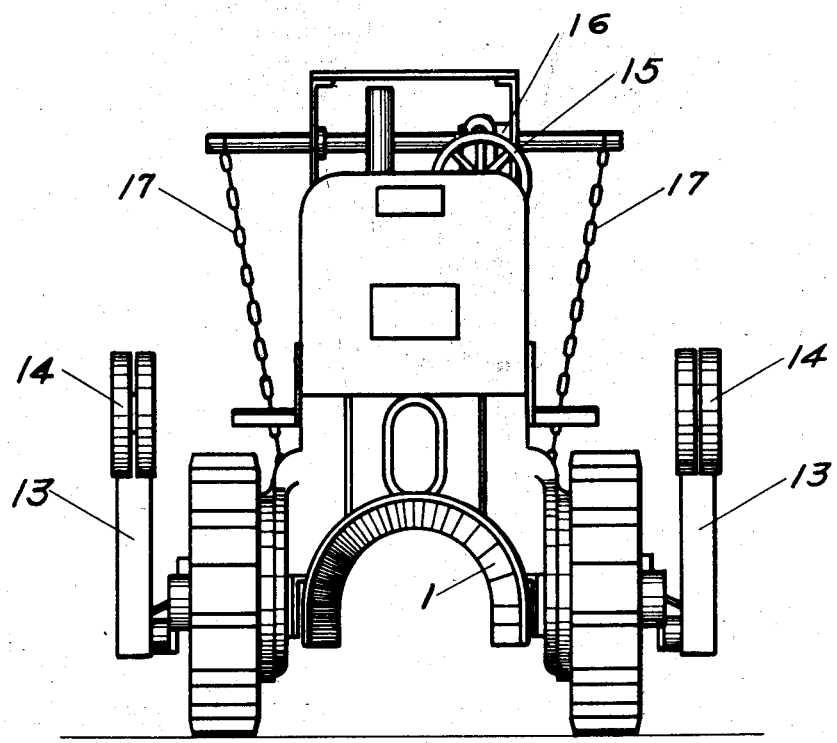

Patented May 16, 1933

1,909,752

UNITED STATES PATENT OFFICE

ADDISON N. CALKINS, OF QUINCY, ILLINOIS, ASSIGNOR TO ELECTRIC WHEEL COMPANY, OF QUINCY, ILLINOIS

TREE AND PLANT DIGGING IMPLEMENT

Application filed January 23, 1932. Serial No. 588,365.

My invention relates to implements for digging trees and all kinds of plants in a manner to avoid injury to the roots. It also loosens the soil around the roots so that the trees and plants are readily taken from the ground without any additional loosening of the soil. In fact, most trees and all plants can be easily pulled out of the ground with one hand after the digger passes under the roots.

Special stress is made on the location of the digger blade in front of the tractor. Heretofore the tractor has passed over the trees and plants first as the digger blade was placed in the rear of the tractor. This location of the blade made it necessary to bend the trees first with consequent injury to the bark on account of the stiffness of the roots when the soil was not loosened by digging before bending. With the soil thoroughly loosened and the trees and plants lifted by the booster blade placed at an upward angle in the center of the digger blade, trees and plants are lifted some 4″ out of their original position in the soil and ready for easy lifting from the ground to the truck or vehicle used for transporting them to shipping or storage buildings.

Other advantages accruing from the location of the U-shaped digger blade in front of tractor are better visibility for the operator when steering, thus avoiding all injury to trees and plants, and the ability to dig a portion of a row and back out without finishing the row, thus greatly increasing the flexibility of the digger.

All of the above features will be pointed out in connection with the accompanying drawings.

Fig. 3 is a front elevation with the U-shaped digger blade on top of the ground.

Fig. 4 is a front elevation with the U-shaped tree digger blade in an operating position.

Fig. 5 is a rear view showing the end of tunnel or inverted trough where trees and plants are discharged after the digging process is completed.

Figure 1:
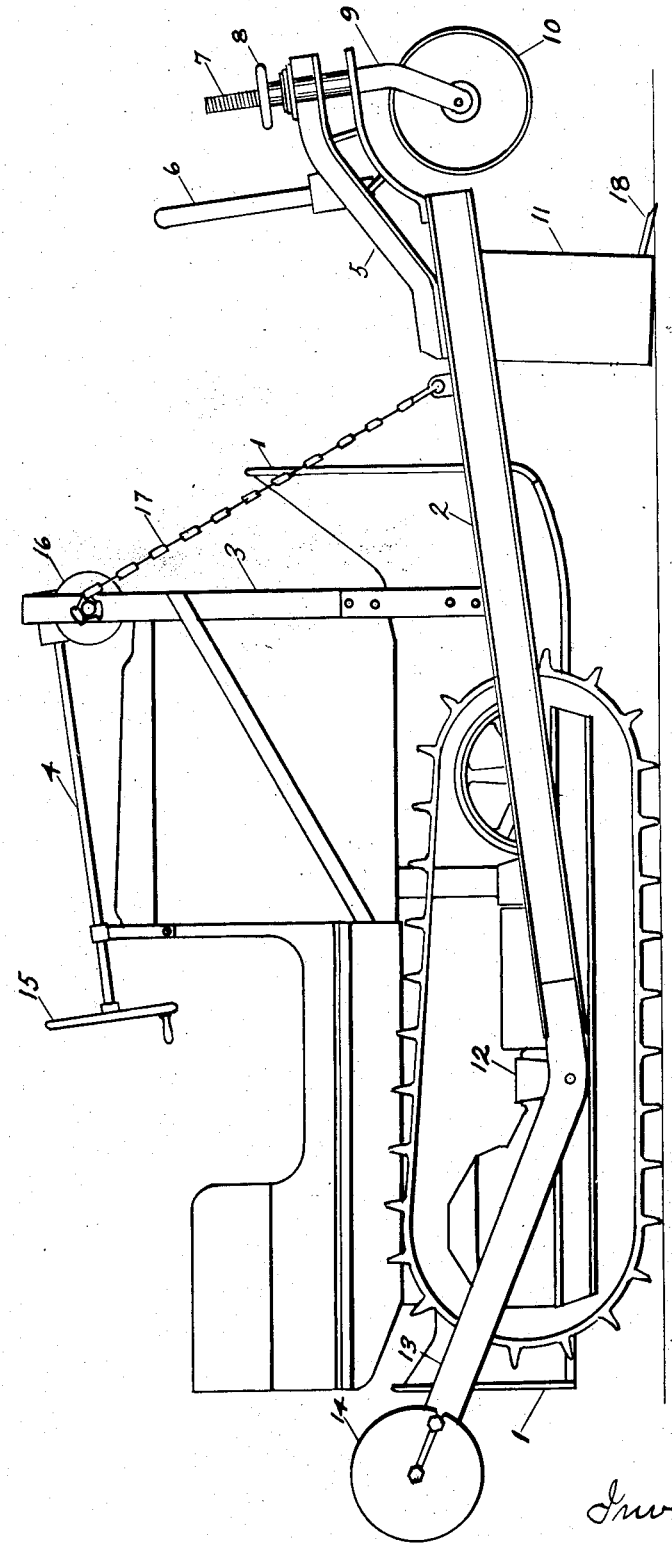
Fig. 1 is a side elevation of a crawler tractor and the tree digger with the U-shaped digger blade on top of the ground.
Figure 2:
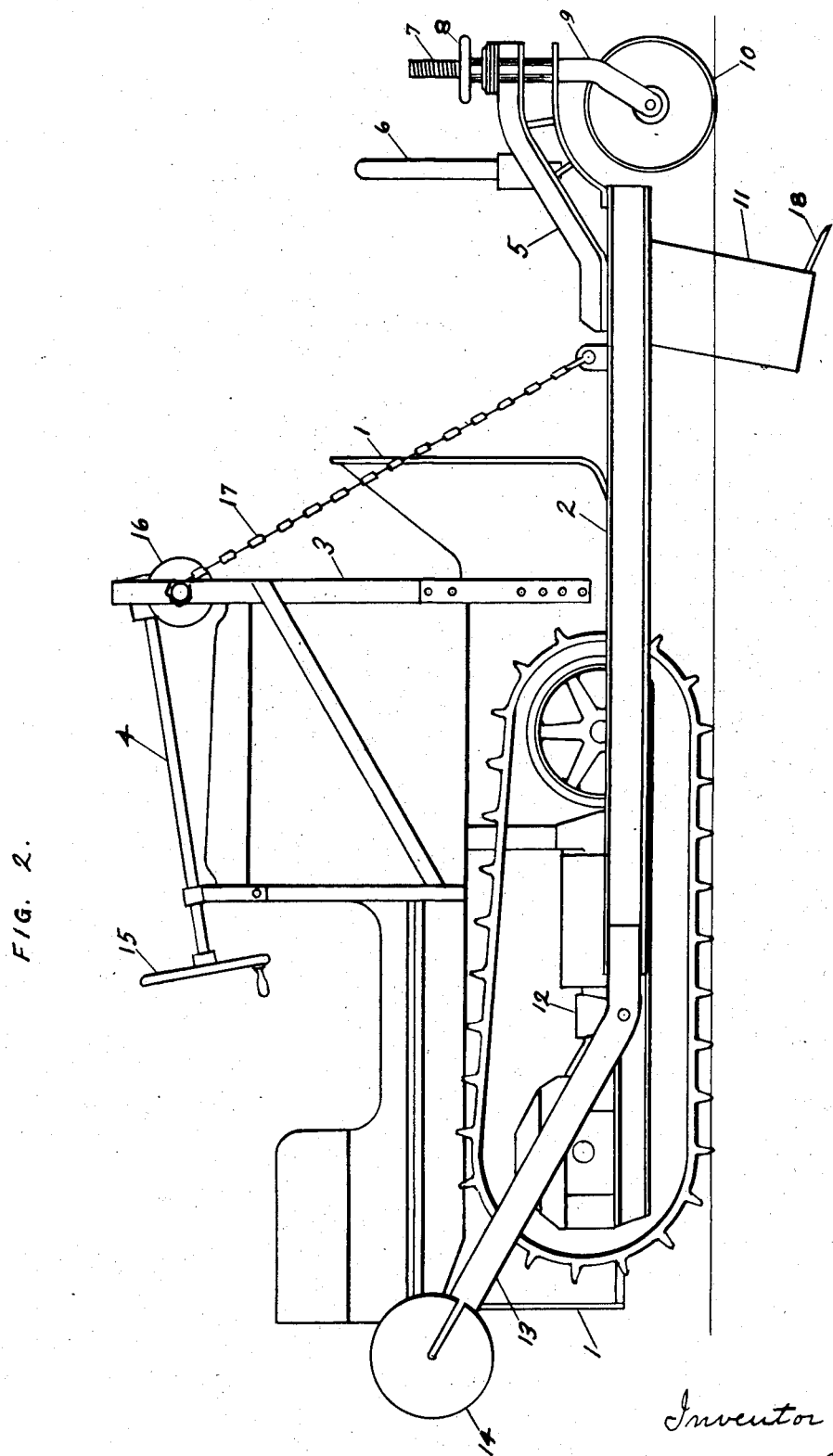
Fig. 2 is a side elevation of a crawler tractor and the tree digger with the U-shaped digger blade lowered into the ground to illustrate its position when digging trees and plants.

In Fig. 1 the U-shaped digger blade 11 is shown in front of the tractor, the U-shaped arch 6 being just ahead of the U-shaped digger blade for piloting the tree into the inverted trough or tunnel 1 which is placed under the tractor with a flare or funnel on the front end for receiving the trees. The tunnel is also flared at the rear end to make backing easier without injury to the trees. Means for adjusting the U-shaped digger blade to a suitable depth for clearing roots consist of caster wheels 10 in the forks 9 which are extended through the frames 5 supported by the frames 2 for carrying the adjustable hand wheels 8 operated on threaded extensions 7 of the fork stems 9. The hoisting mechanism consists of a hand wheel 15 on the shaft 4 which operates a worm and worm wheel 16 for raising and lowering through the chains 17 the beams 2 to which are attached the U-shaped digger blade, U-shaped arch 6 and other necessary parts used in the operation of digging. The counterweight supports 13 carrying the weights 14 are a continuation of the beams 2 and, therefore, counterbalance the U-shaped digger blade 11, the depth gauge wheel 10 and the U-shaped arch 6. The worm gear 16 is supported by the frame 3 which in turn is attached to the front of the tractor. The main frames 2 and the counterweight frames 13 are pivotally supported on hangers 12 on the tractor crawler frames on each side of the crawler.

Having thus described my invention which I claim as new and desire to secure by Letters Patent of the United States, I claim as follows:

1. The combination with a crawler tractor of a U-shaped digger blade located in front of the tractor, means for raising and lowering the digger blade to proper depth for clearing tree and plant roots, counterbalance weights in rear of the tractor for relieving such hoisting mechanism of a portion of the lifting weight substantially as described.

2. A crawler tractor, a U-shaped digger blade placed in front of the tractor, hoisting mechanism for locating the digger blade to correct depth to clear tree and plant roots, counterweights in rear for relieving the hoist of part of its raising load.

3. A tree and plant digger comprising a suitable digger blade placed in front of a tractor, means for adjusting the blade to a suitable depth for clearing roots, means including counterweights for hoisting said blade, a trough or inverted tunnel underneath the tractor for preventing injury to trees and plants when passing beneath the tractor, a U-shaped arch in front of said tunnel for guiding trees into the tunnel during the process of digging.

4. A tree and plant digger comprising a crawler tractor, a U-shaped digger blade placed in front of the tractor, a hoist for raising and lowering the digger blade, an inverted trough or tunnel placed longitudinally below the tractor preventing injury to trees and plants passing under the tractor after passing the digger blade and an arch in front of said tunnel for guiding trees into the tunnel.

5. In a tree and plant digger the combination of a tractor, a digger blade in front of tractor, caster wheels forward of the digger blade for regulating depth, a tunnel under the tractor, an arch between caster wheels and digger blade for piloting trees into the tunnel under the tractor, a hoist for raising and lowering the digger blade substantially as described.

In testimony whereof, I have hereunto affixed my signature.

ADDISON N. CALKINS.